United States Patent [19]

Raquet

[11] 4,392,681

[45] Jul. 12, 1983

[54] ROTATING BODY SYMPATHETIC VIBRATION ABSORBER

[75] Inventor: Erwin Raquet, Witten, Fed. Rep. of Germany

[73] Assignee: Fried, Krupp Huttenwerke AG, Bochum, Fed. Rep. of Germany

[21] Appl. No.: 154,810

[22] Filed: May 30, 1980

[30] Foreign Application Priority Data

Jun. 2, 1979 [DE] Fed. Rep. of Germany ....... 2922585

[51] Int. Cl.³ ...................... B60B 17/00; F16F 15/22; F16H 55/14
[52] U.S. Cl. ........................................ 295/7; 464/180; 74/574; 105/452; 181/209; 295/11; 301/6 WB
[58] Field of Search .......................... 64/1 V; 74/574; 105/452; 181/209, 211, 258, 266, 276; 188/1 B, 218 A; 192/30 V; 238/382; 295/7, 11, 31 A, 31 R; 301/6 WB; 308/8

[56] References Cited

U.S. PATENT DOCUMENTS

| | | | |
|---|---|---|---|
| 1,782,285 | 11/1930 | Bourdon | 295/31 R |
| 1,985,144 | 12/1934 | Bugatti | 295/11 |
| 2,880,599 | 4/1959 | Hinsky | 181/209 X |
| 3,327,812 | 6/1967 | Lazan | 188/1 B |
| 3,388,772 | 6/1968 | Marsch et al. | 188/1 B |
| 3,986,747 | 10/1976 | Raquet et al. | 295/7 X |
| 4,183,572 | 1/1980 | Albrecht et al. | 105/452 X |

FOREIGN PATENT DOCUMENTS 1357309 2/1964 France .................................. 295/11

Primary Examiner—Robert B. Reeves
Assistant Examiner—Howard Beltran
Attorney, Agent, or Firm—McAulay, Fields, Fisher, Goldstein & Nissen

[57] ABSTRACT

In a vibration absorber for resonance vibrations of rotating bodies, in particular rail wheels, comprising several oscillatory plates which establish a damping mass; intermediate layers of damping material separating the plates from each other; a fastener connecting the plates with the rotating body at at least one point and an intermediate layer of damping material coupling the plates over a large remaining area to the rotating body the geometric dimensions of the plates and the intermediate layers and the Shore hardness of the damping material of the intermediate layers is selected such that all plates oscillate at a natural frequency of the rotating body to be damped, but with the amplitudes and phases of the vibrations of the individual plates differing in such a manner, with respect to one another, that the damping material is as strongly distorted as possible.

4 Claims, 11 Drawing Figures

ROTATING BODY SYMPATHETIC VIBRATION ABSORBER

BACKGROUND OF THE INVENTION

This invention relates to vibration absorbers in general and more particularly to a vibration absorber for resonance vibrations of rotating bodies, in particular rail wheels.

Vibration absorbers for resonance vibrations of rotating bodies comprising several oscillatory plates which form or carry the mass, which are separated from one another by intermediate layers of damping material and which are rigidly connected to the rotating body at at least one point and which are coupled to the rotating body over a large remaining area by way of an intermediate layer of damping material, in particular, for resonance vibrations of rail wheels are known (reprint from "ETR-Eisenbahntechnische Rundschau", vol 4/1978). Such vibration absorbers are used to damp the running noise and the screeching of rail wheels. For this purpose, the natural frequency of the individual plates has been tuned to the natural frequency wheel oscillations to be eradicated. The intermediate layers of damping material are used to damp the vibrations of the individual plates.

The object of the present invention is to provide a vibration absorber for resonance vibrations of rotating bodies which effectively damps the determining resonance vibration of the rotating body through creating sympathetic vibrations to sympathetically dampen the wheel vibrations.

SUMMARY OF THE INVENTION

This object is solved according to the present invention by tuning the plates and the intermediate layers to one another through a selection of the geometric dimensions of the plates and intermediate layers and of the Shore hardness of damping material of the intermediate layers in such a way that all plates oscillate at the natural frequency of the rotating body to be damped with the amplitudes and phases of the vibrations of the individual plates being in such a relationship to one another that the damping material is as strongly distorted as possible.

The present invention is based on the realization that an effective damping does not depend on the individual plates vibrating at different frequencies but rather depends on the individual plates vibrating at the same frequency but with different phase and different amplitudes, i.e., the plates vibrate against one another, so that the damping material is strongly distorted and irreversible oscillation energy is thereby withdrawn from the rotating body. The tuning to the generally clearly defined resonance frequency of the rotating body is not critical since the vibration absorber has a wide band resonance point.

The coupling of the vibration absorber to the rotating body is particularly simple if it is secured to a plate constructed as an assembly and carrier plate which is then rigidly secured to the rotating body. Since the assembly and carrier plate is in this case a functional part of the rotating body, the intermediate layer, which couples over a large area, is provided between the carrier plate and the adjacent oscillatory plate.

Particularly good results have been achieved with a vibration absorber in which the intermediate layers extend over almost the entire length of the plate leaving only a short end section of each plate free.

In practice, the vibration absorbers which have proved reliable are those in which the hardness of the damping material lies between 1 and 30 Shore and the layer thickness respectively lies between 1 and 5 mm with a plate length of 100 to 600 mm and a plate width of 5 to 100 mm and a plate thickness of 1 to 5 mm. Steel is the most suitable plate material.

DETAILED DESCRIPTION OF THE INVENTION

Figure 1:
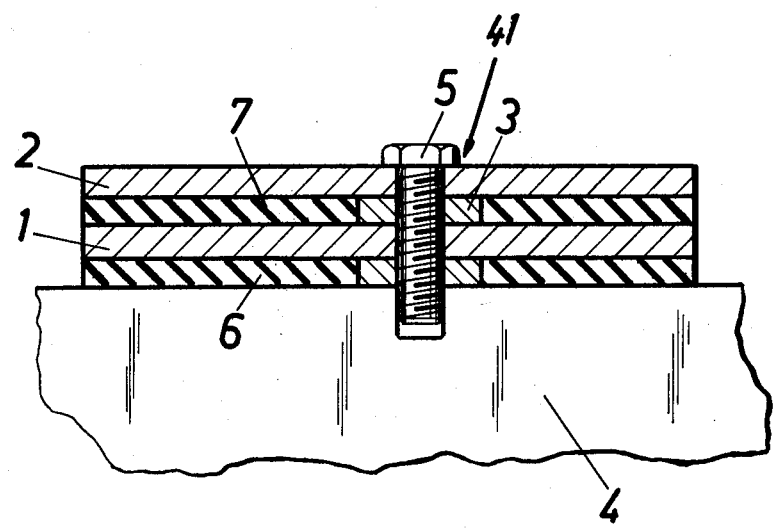
FIG. 1 is a lateral view of a vibration absorber which is rigidly secured to a rotating body in approximately the central area thereof.

The vibration absorber shown in FIG. 1 is composed of two rectangular flat metal plates 1 and 2 which are secured slightly outside their center to a rotating body by means of a bolt 5 and a central solid section 41 which is made up of parts of the plates 1 and 2 and washers 3. Intermediate layers 6 and 7 composed of a flexible damping material are positioned between the plates 1 and 2 and between plate 1 and the rotating body 4. In such a vibration absorber the vibration nodal point is established by the rigid fixture, established by solid portion 41 and bolt 5, to the rotating body 4. The plates 1 and 2 can vibrate like the tines of a tuning fork, these vibrations thereby being damped by the damping material. Due to the coupling to the rotating body over a large area, the vibration absorber also absorbs vibrations moving over the rotating body.

Figure 2:
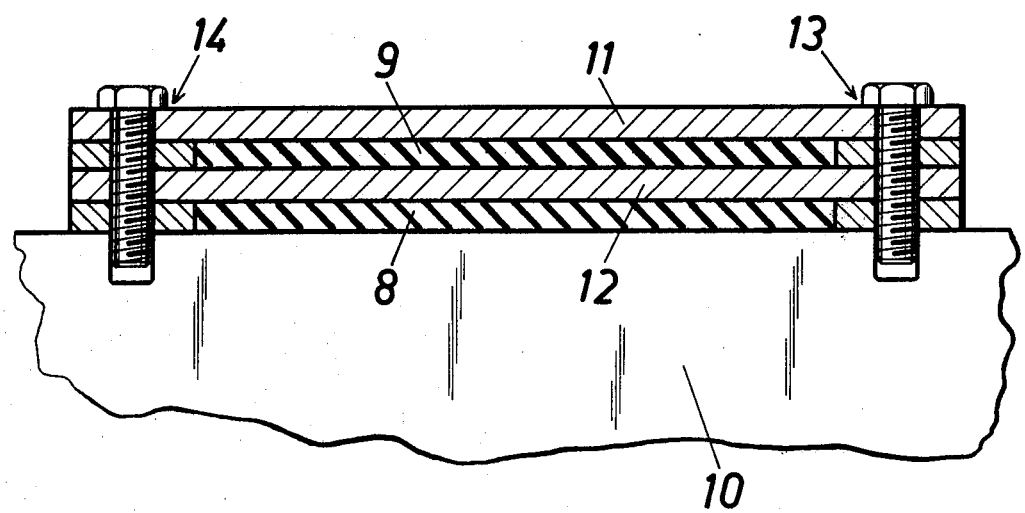
FIG. 2 is a lateral view of a vibration absorber which is rigidly secured to a rotating body at both its ends.

The embodiment of FIG. 2 differs from that of FIG. 1 only in that the oscillatory plates 11 and 12 which are separated from one another and from the rotating body 10 by intermediate layers 8 and 9, are rigidly secured to the rotating body 10 at both ends by rigid fixtures 13 and 14. In addition to these two embodiments it is also possible to connect the individual plates rigidly to the rotating body at only one end.

Figure 3:
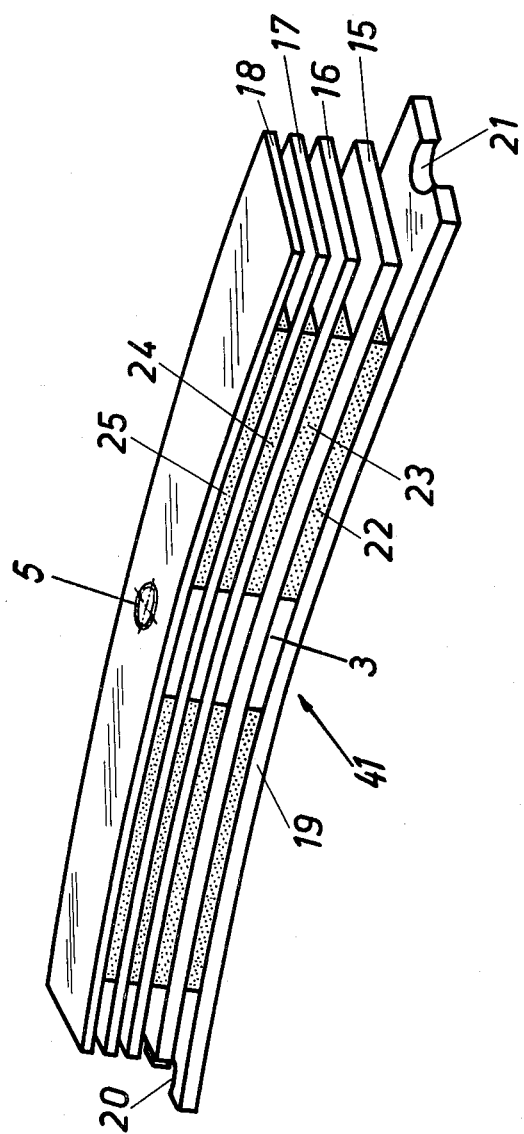
FIG. 3 is an isometric view of a vibration absorber similar to the embodiment of FIG. 1 constructed on a carrier and assembly plate.

The essential differences between the embodiment of FIG. 3 and the embodiment of FIG. 1 resides in the fact that the centrally, rigidly interconnected plates 15, 16, 17 and 18 are rigidly disposed on a carrier and assembly plate 19 with fastening lugs 20 and 21 protruding at its ends and in that the intermediate layers 22, 23, 24 and 25 do not extend up to the plate ends. The plates 15–19 are composed of steel. The length of the plates 15–18 from the clamping point to each end equals 90 mm, their width is 30 mm and the respective thickness of the plates 15–18, starting from plate 15, is 4 mm; 3 mm; 2mm and 1.5 mm. The intermediate layers 22–25 extend over a length of 75 mm and over the entire width. The flexible damping material of layers 22–25 has a hardness of 3 Shore.

Figure 4:
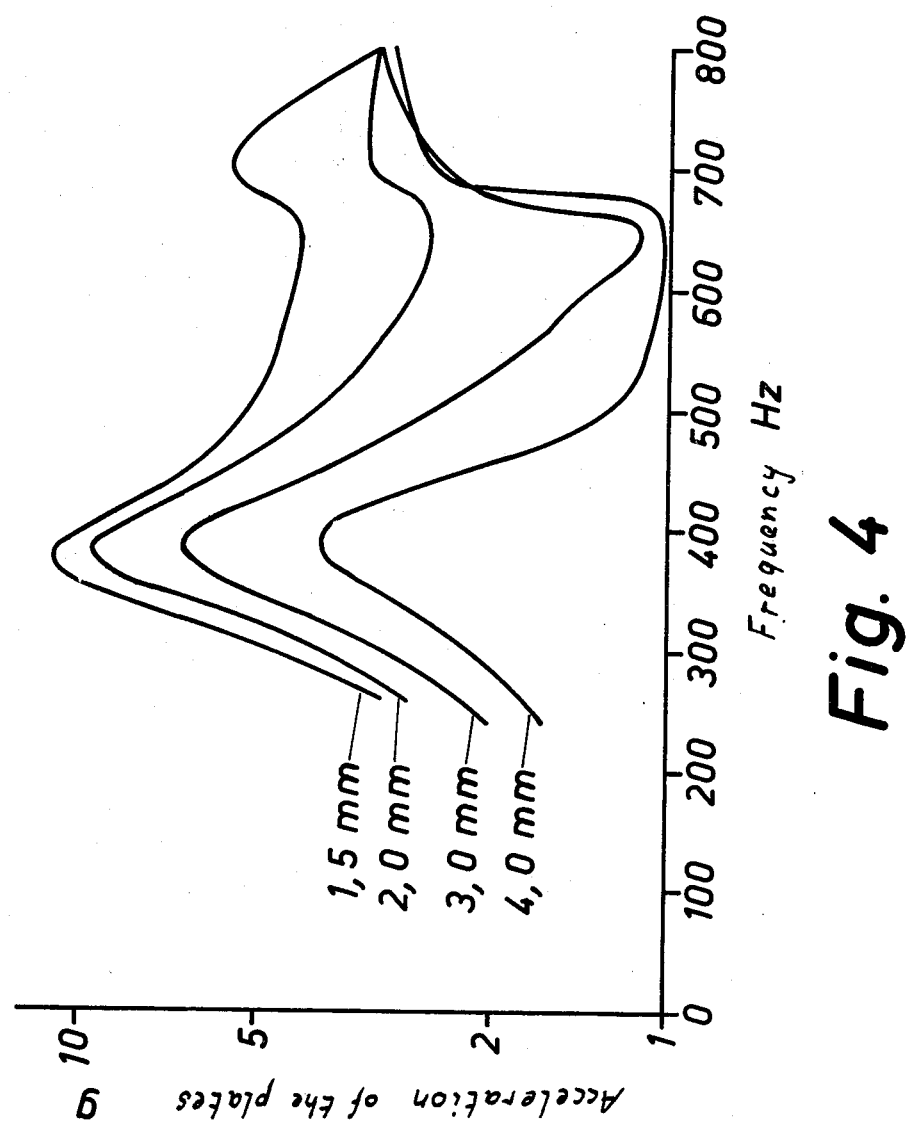
FIGS. 4 and 5 are curves illustrating the vibration behavior of the vibration absorber according to FIG. 3, with respect to amplitude and phase, respectively.
Figure 5:
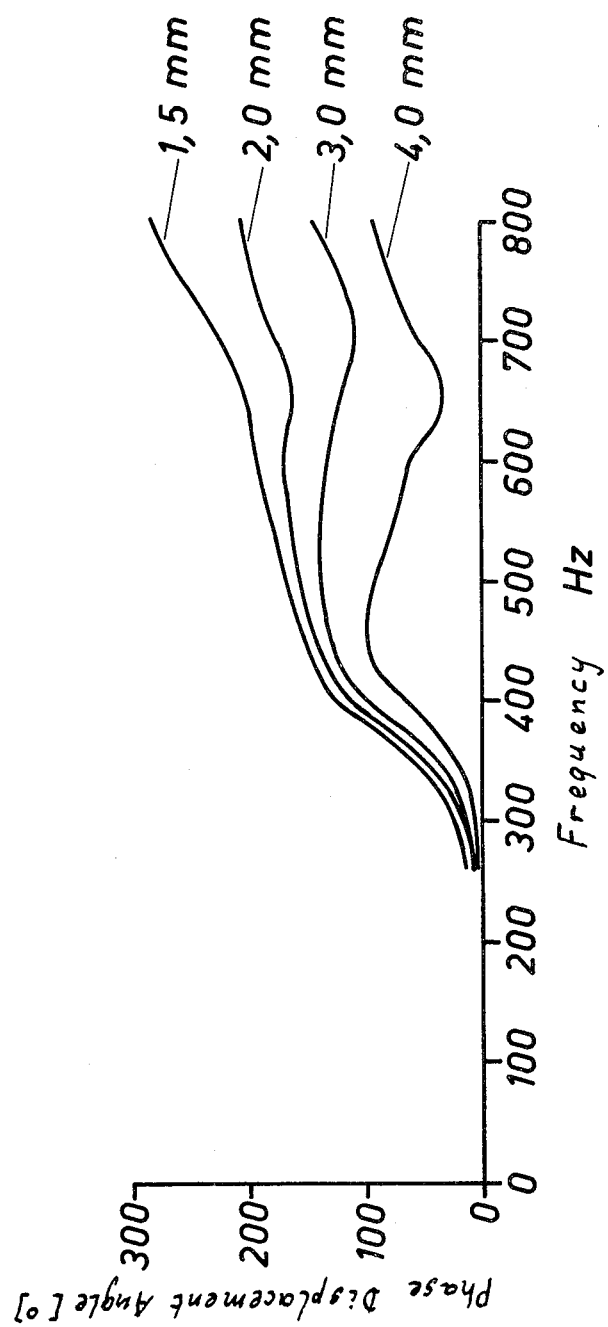

Vibration behavior as shown in curves of FIGS. 4 and 5 results for a plate constructed in such a manner. FIG. 4 shows that, in spite of differing plate thicknesses, all the plates vibrate with the very same resonance frequency of slightly less than 400 Hz. The vibrational amplitude of the individual plates varies.

Furthermore, it can be seen from FIG. 5 that the phase relation of the vibrations of the individual plates also varies. In view of these two differences the individual plates vibrate against one another, which leads to a strong distortion of the damping intermediate layer. It is clear that the differences in the amplitude and the phase relation should be as great as possible in order to achieve optimum damping effect.

Figure 6:
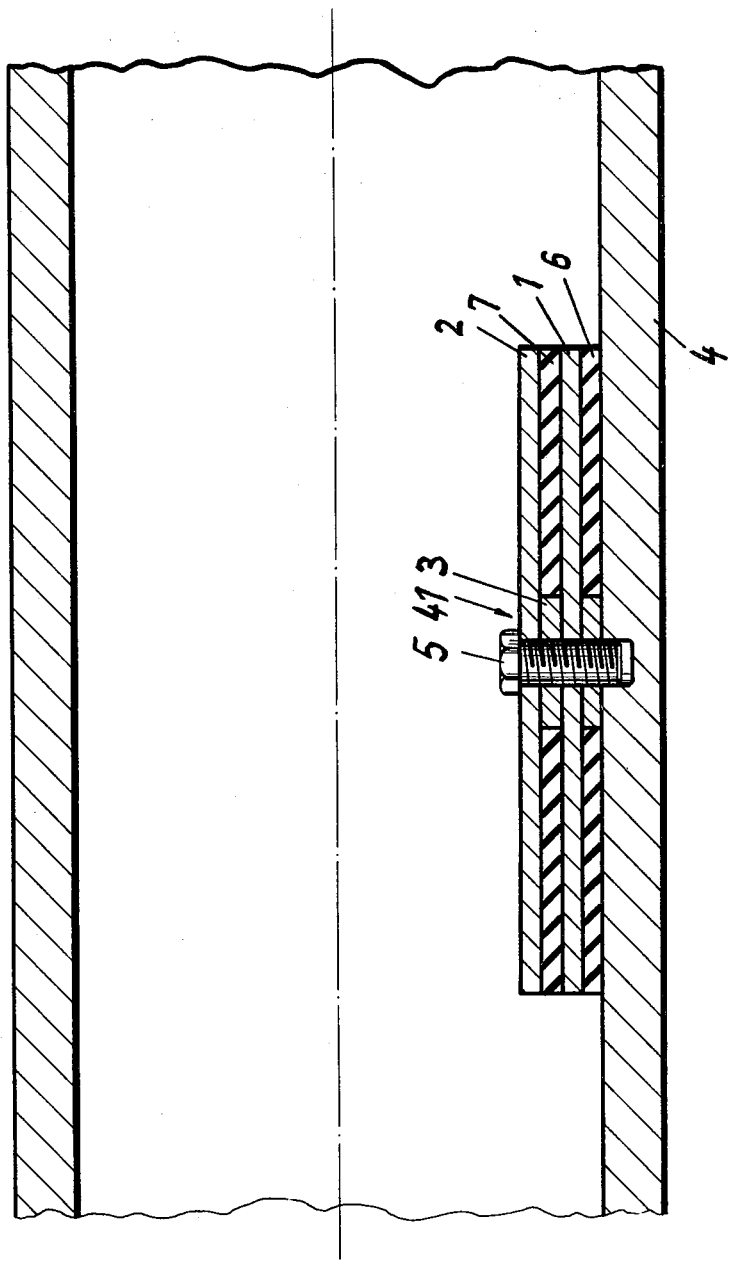
FIG. 6 illustrates a vibration absorber for flexural vibrations built into a hollow shaft.
Figure 7:
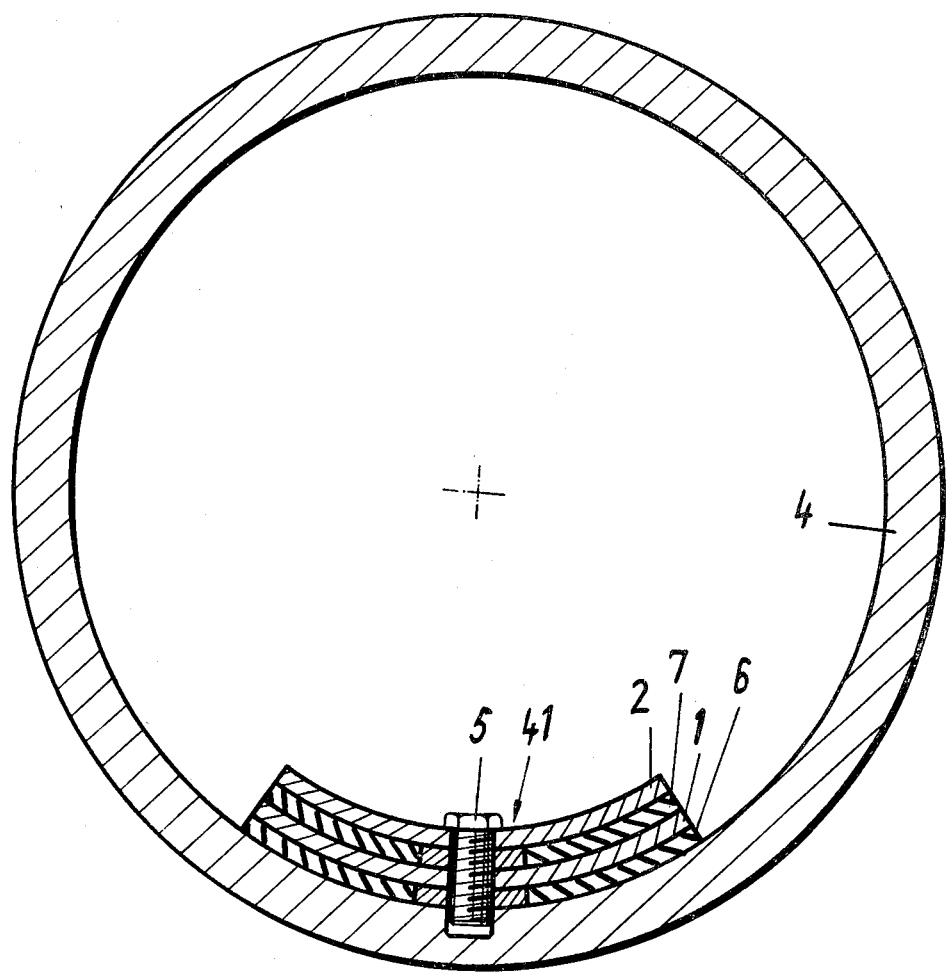
FIG. 7 illustrates a vibration absorber for radial vibrations built into a hollow shaft.

The vibration absorber of the embodiments of FIGS. 6 and 7 corresponds to that of FIG. 1. However the plates and the intermediate layers are curved to match the curvature of the rotating body 4. In the embodiment of FIG. 6, the plates extend longitudinally of the hollow shaft so that they preferably damp flexural vibrations, whereas, in the embodiment of FIG. 7, they extend in the direction of the periphery and therefore preferably damp radial vibrations.

Figure 8:
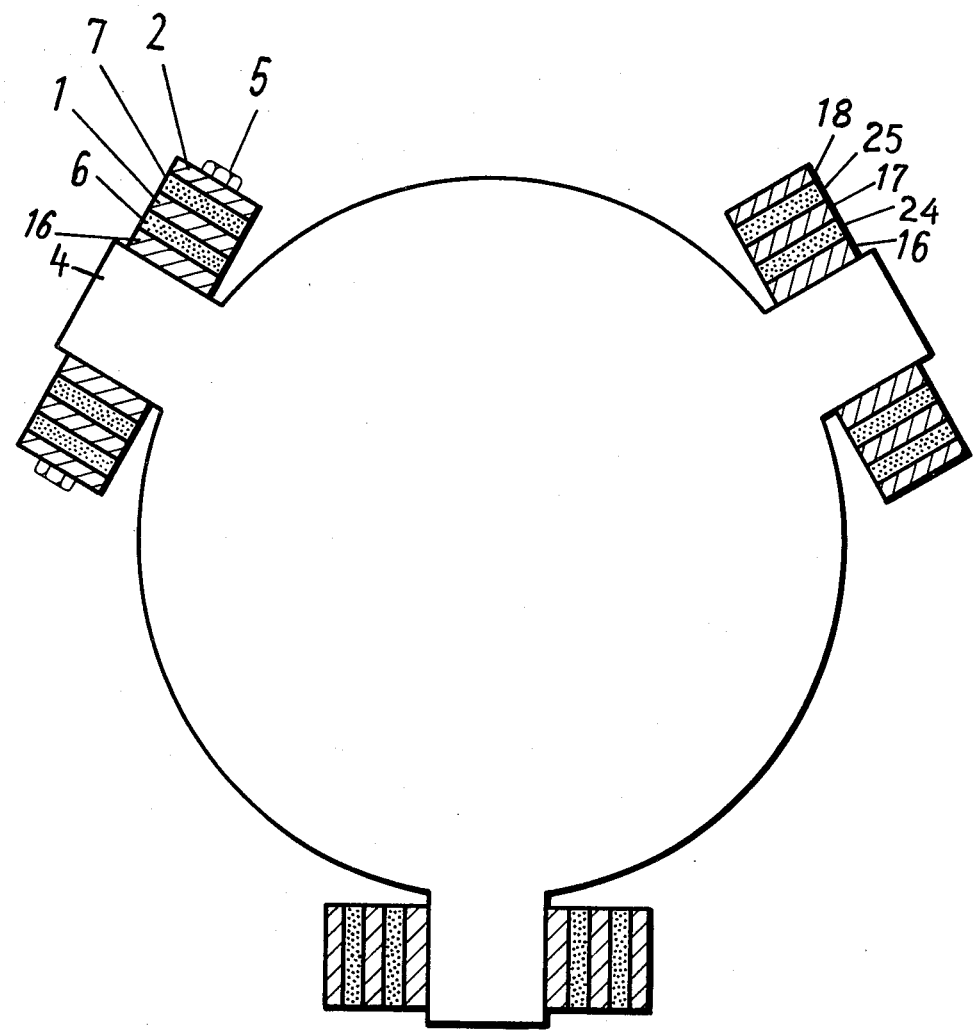
FIG. 8 illustrates three vibration absorbers for torsional vibrations disposed on a shaft.

In the embodiment of FIG. 8 the plates are oriented exteriorly of the shaft with bolt 5 transverse to the longitudinal axis of the shaft that they can damp torsional vibrations of the shaft. Some of the torsional damping elements have the bolt removed.

Figure 9:
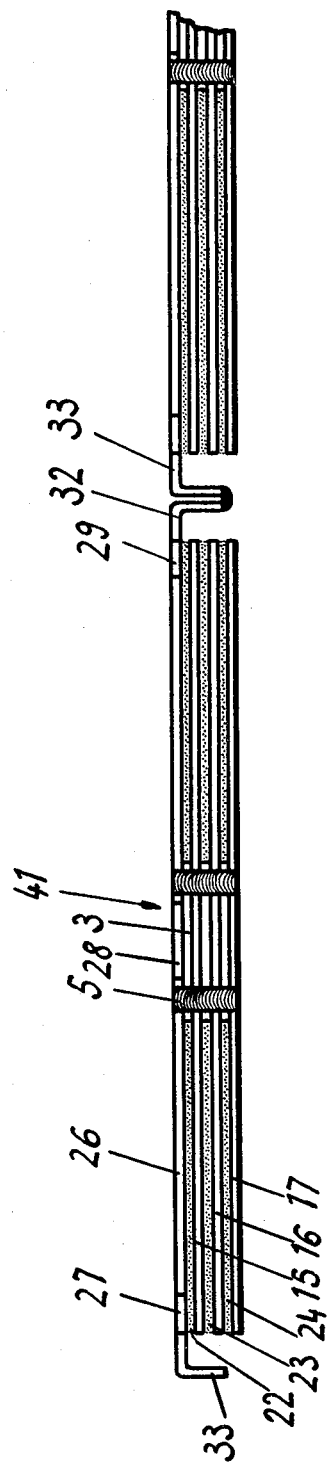
FIG. 9 is a lateral view of a vibration absorber for rail wheels.
Figure 10:
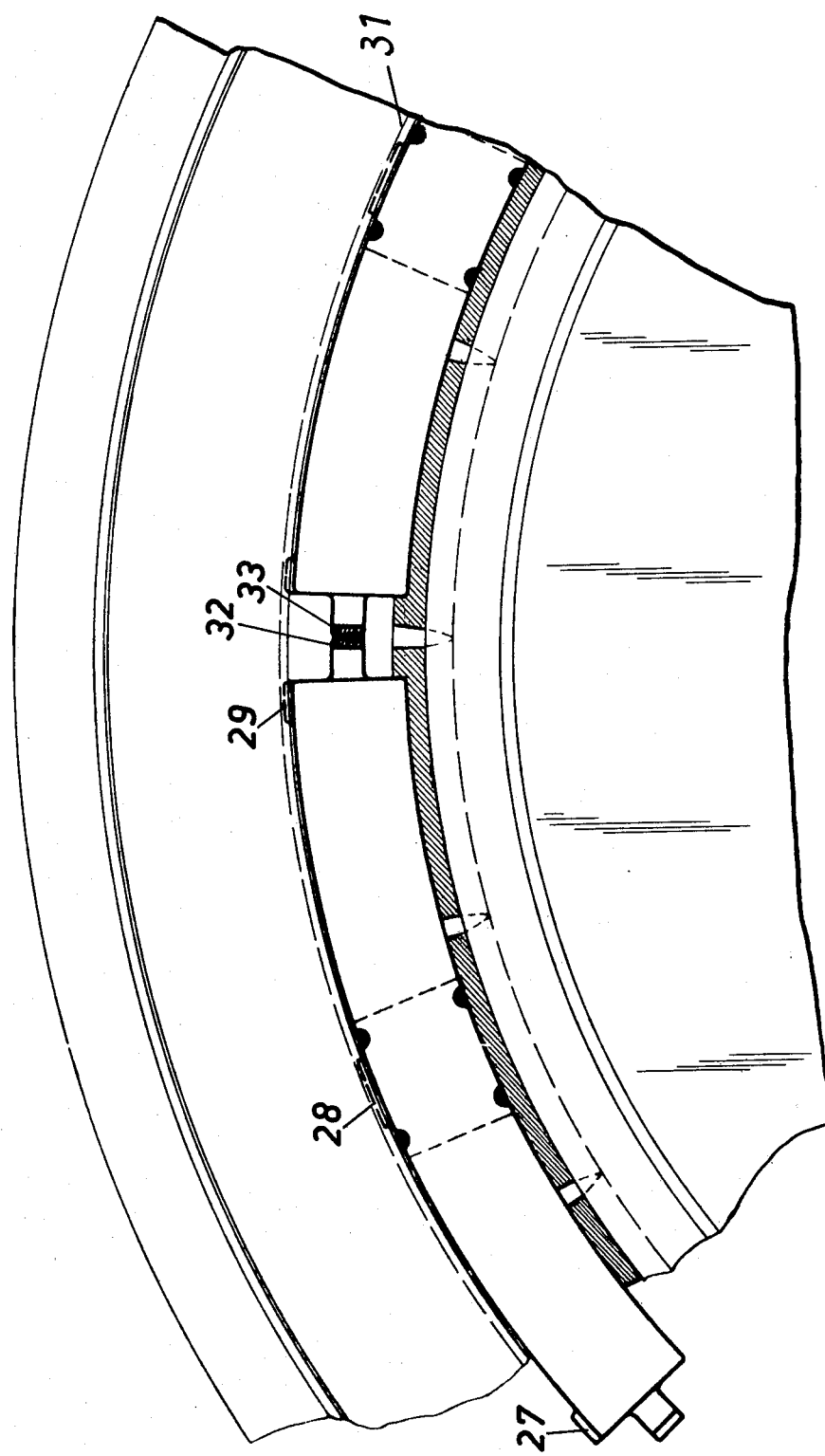
FIG. 10 is a lateral view of a section of a rail wheel with vibration absorbers according to FIG. 9.
Figure 11:
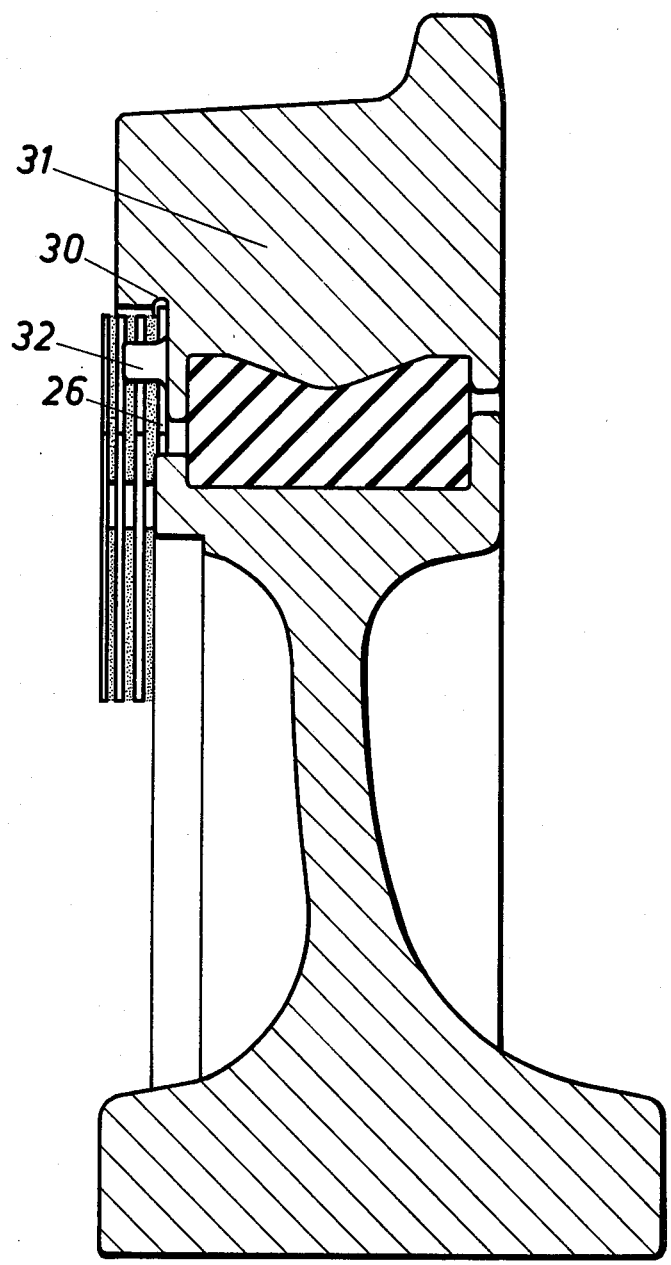
FIG. 11 is an axial cross-section of the rail wheel according to FIG. 10.

The vibration absorber according to the embodiment of FIG. 9 closely resembles the vibration absorber of the embodiment of FIG. 3. However this embodiment has a special design so that it can be secured to a rail wheel in a simple manner. As FIG. 10 shows, the individual plates are slightly curved in longitudinal direction. Their assembly and carrier plates 26 have outwardly directed tappets 27, 28 and 29, in the center and at each end, with which they engage in a recess 30 in the wheel part 31 as shown in FIG. 11. Several vibration absorbers of this construction are arranged in the direction of the periphery of the wheel. Adjacent vibration absorbers abut against one another with tongues 32 and 33 of the carrier plates 26 arranged on their ends. The abutting tongues 32 and 33 are welded to one another so that the vibration absorbers form a closed ring. The carrier plates are bonded to the front sides of ring surfaces pointing radially inwards. If the bonded joint is broken, the vibration absorbers are held by their outwardly directed tappets 27 to 29.

In order to damp different frequencies of the wheel, each vibration absorber is tuned to a specific frequency. In contrast to the known vibration absorbers where the individual plates are tuned to the different frequencies of the wheel, a substantially better damping of the vibration is achieved by the vibration absorber according to the present invention.

What is claimed is:

1. A vibration absorber for damping the determining resonance vibrations of rotating bodies through creating sympathetic vibrations to sympathetically dampen the wheel vibrations, in particular rail wheels, comprising:

several plates forming a unit which establish a mass;
intermediate layers of compressible damping material separating said plates from each other so that said damping material is compressed during vibration of said plates;
means connecting said plates with the rotating body at at least one point; so that the plates vibrate like the tines of a tuning fork and a vibration nodal point is established at said connecting means and
an intermediate layer of damping material between said plates over a large connecting area thereof and coupled by connecting means to the rotating body;
the geometric dimensions of said plates and said intermediate layers and the Shore hardness of said damping material of the intermediate layers are selected such that all plates oscillate at substantially the same natural frequency of the rotating body to be damped, and the amplitudes and phases of the vibrations of the individual plates differ, in such a manner, with respect to one another, that the damping material is distorted as strongly as possible within its elastic limit.

2. The vibration absorber of claim 1 wherein said intermediate layers of damping material of said plates are shorter than said plates and are spaced from the ends of said plates, so as to leave a short end section free at each plate.

3. The vibration absorber of claim 2 or 1 including a rigid fixture securing said absorber at one of said ends to the rotating body.

4. The vibration absorber of claim 2 or 1, wherein the configuration of said plates and said intermediate layers are curved to conform to the curvature of the rotating body.

* * * * *